(12) United States Patent
Forster et al.

(10) Patent No.: US 8,804,768 B2
(45) Date of Patent: Aug. 12, 2014

(54) APPARATUS AND METHOD FOR TRANSMITTING A PLURALITY OF INFORMATION SIGNALS IN FLEXIBLE TIME-DIVISION MULTIPLEXING

(75) Inventors: Christian Forster, Nuremburg (DE); Andreas Mull, Nuremburg (DE); Stefan Doehla, Erlangen (DE); Heinz Gerhaeuser, Waischenfeld (DE); Albert Heuberger, Erlangen (DE)

(73) Assignees: Fraunhofer-Gesellschaft zur Foerderung der angewandten Forschung e.V., Munich (DE); Friedrich-Alexander-Universitaet Erlangen-Nuernberg, Erlangen (DE)

( * ) Notice: Subject to any disclaimer, the term of this patent is extended or adjusted under 35 U.S.C. 154(b) by 128 days.

(21) Appl. No.: 13/233,188

(22) Filed: Sep. 15, 2011

(65) Prior Publication Data
US 2012/0069857 A1 Mar. 22, 2012

Related U.S. Application Data

(63) Continuation of application No. PCT/EP2010/053203, filed on Mar. 12, 2010.

(30) Foreign Application Priority Data

Mar. 19, 2009 (EP) .................... 09003963

(51) Int. Cl.
*H04J 3/00* (2006.01)
*H04H 20/42* (2008.01)
*H04H 20/72* (2008.01)
*H04N 21/643* (2011.01)
*H04N 21/2365* (2011.01)
*H04H 20/57* (2008.01)
*H04N 21/2362* (2011.01)
*H04N 21/434* (2011.01)
*H04J 3/16* (2006.01)

(52) U.S. Cl.
CPC .............. *H04J 3/1682* (2013.01); *H04H 20/42* (2013.01); *H04H 20/72* (2013.01); *H04N 21/64315* (2013.01); *H04N 20/30* (2013.01); *H04N 21/23655* (2013.01); *H04N 21/2365* (2013.01); *H04H 20/57* (2013.01); *H04N 21/2362* (2013.01); *H04N 21/4347* (2013.01)
USPC ........................... 370/498; 370/465; 370/510

(58) Field of Classification Search
USPC ......... 370/465, 468, 478, 487, 498, 504, 508, 370/510, 511; 375/240.02, 240.12, 240.28, 375/240.23; 725/112, 113, 131
See application file for complete search history.

(56) References Cited

U.S. PATENT DOCUMENTS

| | | | |
|---|---|---|---|
| 5,471,670 A | 11/1995 | Hess et al. | |
| 6,418,122 B1 | 7/2002 | Schoenblum et al. | |
| 7,009,997 B2 | 3/2006 | Huang et al. | |
| 7,333,515 B1 * | 2/2008 | Ramakrishnan et al. | 370/487 |
| 2002/0154694 A1 | 10/2002 | Birch | |
| 2006/0262810 A1 * | 11/2006 | Vadakital et al. | 370/473 |
| 2007/0165709 A1 | 7/2007 | Walker et al. | |
| 2008/0298337 A1 * | 12/2008 | Rezaei et al. | 370/345 |
| 2008/0304520 A1 * | 12/2008 | Hannuksela et al. | 370/498 |
| 2009/0007207 A1 * | 1/2009 | Kashalkar et al. | 725/113 |
| 2010/0095336 A1 | 4/2010 | Hirano et al. | |
| 2010/0313237 A1 * | 12/2010 | van Gassel et al. | 725/146 |

FOREIGN PATENT DOCUMENTS

| | | |
|---|---|---|
| EP | 1 717 974 A2 | 11/2006 |
| JP | 10-500822 A | 1/1998 |
| JP | 2001-516995 A | 10/2001 |
| JP | 2001-518268 A | 10/2001 |
| JP | 2002-536889 A | 10/2002 |
| JP | 2009-518898 A | 5/2009 |
| RU | 2 117 396 C1 | 8/1998 |
| WO | 01/76093 A1 | 10/2001 |
| WO | 2004/039002 A2 | 5/2004 |
| WO | 2007/114862 A2 | 10/2007 |
| WO | 2008/044306 A1 | 4/2008 |
| WO | 2008/083827 A2 | 7/2008 |

$T_1[n+1] \geq T_1[n] + \text{delta-}T_1[n]$ $T_2[n+1] \geq T_2[n] + \text{delta-}T_2[n]$ $T_3[n+1] \geq T_3[n] + \text{delta-}T_3[n]$

OTHER PUBLICATIONS

Official Communication issued in International Patent Application No. PCT/EP2010/053203, mailed on Apr. 27, 2010.
"Digital Video Broadcasting (DVB); DVB-H Implementation Guidelines, ETSI TR 102 377", vol. BC, No. V1.1.1, LIS, Sophia Antipolis Cedex, France, Feb. 1, 2005, pp. 1-30.
Official Communication issued in corresponding Japanese Patent Application No. 2012-500200, mailed on Jul. 2, 2013.
Official Communication issued in corresponding Russian Patent Application No. 2011 137 841, mailed on Mar. 15, 2013.

* cited by examiner

*Primary Examiner* — Awet Haile
(74) *Attorney, Agent, or Firm* — Keating & Bennett, LLP

(57) ABSTRACT

Exact data-rate analysis of the information signal portions to be transmitted in a subsequent transmission cycle per time-division multiplexing process shall be initially omitted. Instead, on the basis of highly accurate estimated values for the subsequent data rates, estimated values for relative waiting times are transmitted, in a current transmission cycle, from the current time slice to the subsequent time slice of the same service. In the subsequent transmission cycle, actual data rates may be set which may deviate from the estimated data rates for the individual information signals, as a result of which predicted time-slice boundaries for the subsequent transmission cycle may shift. However, the potential shift in the time-slice boundaries is subject to several boundary conditions. No time slice of the subsequent transmission cycle can start prior to its signaled estimated starting time. With constant data rates, the estimated time-slice structure and the actual time-slice structure are identical.

13 Claims, 8 Drawing Sheets

APPARATUS AND METHOD FOR TRANSMITTING A PLURALITY OF INFORMATION SIGNALS IN FLEXIBLE TIME-DIVISION MULTIPLEXING

The present invention relates to a concept for transmitting a plurality of information signals in statistical multiplexing, in particular in statistical time-division multiplexing as may be employed, for example, for transmitting audio-visual contents in a digital video broadcasting system.

BACKGROUND OF THE INVENTION

In a DVB-H system (DVB-H=digital video broadcasting handhelds), several multimedia services, in particular digital video signals, may be transmitted, in a transport stream, in time-division multiplexing via a transmission channel having a quasi-constant bit or data rate. If each video signal is assigned a fixed data or encoding rate, in accordance with an encoded information signal, a program provider, for example, will be forced to find a tradeoff between a transmission capacity that is sometimes expensive and a picture quality that may be achieved for critical scenes. Occasionally, a data or compression rate will not suffice in this context, and scenes that are rich in detail might suffer an impairment of quality. On the other hand, with a fixedly assigned encoding rate, it may also happen that the assigned encoding rate exceeds an encoding rate that may be used for a current scene, and that, therefore, the encoding rate, or cost, is wasted.

Depending on a current picture content, a video encoder may use different levels of data and/or encoding rates so as to ensure, for example, a high-quality television transmission. A sports broadcast, for example, typically uses a higher data rate—because its picture contents contain a lot of motion—than, e.g., a talk show or a news broadcast, which has rather static picture contents. Particularly high data rates are used for transmitting scenes that are rich in detail and contain a lot of motion.

Video encoding and/or compression methods are based, for example, on predictions, such as the so-called hybrid encoders, which perform, for a picture, a motion-compensated or picture-internal prediction with subsequent, e.g. entropy-based, compression of the remainder of the prediction. This means, similarities within a picture (intra) and/or among the pictures (inter) are exploited for making a prediction. Said predictions works with varying degrees of success, depending on the picture content. Accordingly, the residual signal will be larger or smaller, depending on the quality of the prediction. A larger residual signal uses a larger number of bits for encoding. Conversely, encoding of the motion compensation also involves, as side information, bits for encoding, so that a more complex prediction does not necessarily result in an improved compression rate. Overall, an ideal picture quality, or an ideal tradeoff between rate and quality, may be found for various data rates available and, therefore, for various compression rates. This relationship between the rate available and the picture quality achievable is dependent on the signal. Therefore, different compression rates or data rates are used for encoding for different scenes in order to achieve the same subjective picture quality.

The larger a number of programs or a number of program providers, the more unlikely it will be that all of the programs simultaneously use a very high data rate for being encoded. If several information signals, in particular videos, are transmitted in a transport stream via a channel having a constant overall data rate, said differences in the data rates may be exploited in assigning data rates to the individual services.

To this end, the individual data rates of a DVB-H network may be configured dynamically in accordance with a so-called statistic multiplex. This involves distributing the data rates such that a ratio between the encoding rate and the picture quality becomes optimal. This method is cooperative and involves that a sum of data rates of the individual services remains smaller than the available overall data rate. Instead of allotting a fixed data rate to each information signal, the statistical multiplexing analyzes contents of the picture material to be transmitted and assigns different individual data rates, depending on the prediction properties, to the plurality of information signals for shared transmission in a transport stream via the channel having the constant overall data rate. Instead of assigning a maximally used data rate to each video, it is thus possible to operate with a clearly reduced average data rate per video without reducing the picture quality perceived. Therefore, an overall impairment of quality may be reduced in this manner.

Reception of videos or information signals at a mobile terminal, such as a DVB-H receiver, should obviously not result in its battery being depleted within a very short time. For DVB-T systems (DVB-T=digital video broadcasting terrestrial), an entire data stream may be decoded before access may be made to any of the services contained within the data stream, such as TV programs, for example. With DVB-H, one uses the so-called time slicing technique, wherein only part, or a time slice, of the data stream is received which contains data of a service or program that has just been selected. With DVB-H, merging or multiplexing of different services is therefore performed in pure time-division multiplexing, wherein information signals of each service are periodically sent in compressed data packets or time slices. Thus, an individual service is not emitted continuously, but only from time to time and at a correspondingly high data rate, and sometimes it is not emitted at all. Time-division multiplexing of several services will then yield a continuous data stream with a quasi-constant data rate, as is shown in FIG. 7, for example.

FIG. 7 shows a continuous data stream 700 with a constant mean data rate $B_R$. The data stream 700 represents an MPEG transport stream that is made up of MPEG-2-compatible (MPEG=moving picture experts group) elementary data streams organized into time slices 702. FIG. 7 reveals that program-specific information and meta data 704 (PSI/SI) are not subject to the time slicing method. In addition, neither a fixed, e.g. repetitive, assignment of the individual services to time slices 702, nor a fixed magnitude or duration of same is prescribed, even though in many DVB-H multiplexes such a fixed structure is used anyway. The duration of a time slice 702 associated with an information signal generally depends on the size of the current data packets of the respective service that are to be transmitted within said time slice. For example, if a video signal currently involves a comparatively high encoding rate, the time slice 702 that may be associated with the video signal will have a correspondingly long time duration.

Due to the variable time-slice structure depicted in FIG. 7, a receiver of the data stream 700 may have the precise position and configuration of the time slices 702 transmitted to it, so that the sequential data flow of the individual broadcasting services may be reconstructed therefrom. For DVB-H, the so-called delta-T method is used to this end. It includes transmitting, within each time slice 702, a relative waiting time delta-T informing the receiver when the next time slice of the same service is receivable. The system allows signaling waiting times within a range of a few milliseconds up to about 30 seconds (see FIG. 8).

Within the receiver, incoming time slices 702 are buffered and subsequently read out at a constant rate (at the average data or encoding rate of the respective service). The duration of the time slices 702 is typically within a range of several hundred milliseconds, whereas the switch-off time, in accordance with delta-T, of the receiver between the time slices may be many seconds (see above). Depending on the ratio of on/off-time, power savings of more than 90% as compared to DVB-T may result. For this purpose, time slicing presupposes a sufficient number of services or information signals in order to be as effective as possible.

In a DVB-H system, information signals or services are transmitted on the basis of the internet protocol (IP). This approach enables simple connection with other networks. The MPEG-2 transport stream 700 serves as a physical carrier. Embedding of IP data within the transport stream is effected by using an existing adaptation protocol, so-called multi-protocol encapsulation (MPE). To protect the transport stream 700 from interfering effects of a radio channel, DVB-H additionally comprises resorting to an error protection (MPE-FEC), which is applied at the level of the IP data stream before the IP data is encapsulated by means of MPE. By this mechanism, the receiving power is to be generally improved, in particular the reliability for mobile reception and with strong pulse-shaped interferences as may occur, for example, due to multipath propagation and resulting destructive interferences at the point of reception.

MPE-FEC is very similar to time slicing and MPE. These three techniques are directly tuned to one another, and together form the so-called DVB-H codec. IP data streams from the various sources are multiplexed as individual elementary streams by the time slicing method. The error protection MPE-FEC is calculated separately for each individual elementary stream and is added. This is followed by encapsulating the IP packets into the so-called sections of the multi-protocol encapsulation and, subsequently, by embedding into the transport stream.

With regard to temporal behavior, the disadvantage of the delta-T method is that the data or encoding rate of a DVB-H service can be changed only for the future time slices of the respective service. An algorithmic delay results, which corresponds to the distance of the time slices of the individual services. In the event of constant-rate services, this disadvantage is not relevant. In this case, the payload data of the services may be immediately encapsulated and combined into time slices.

This is different, however, for services that employ a variable data/encoding rate, such as in statistical multiplexing, for example. Due to the offset signaling, such services may be delayed in accordance with the repetition rate of the time slices assigned. To be able to indicate, in the time slices of a current transmission cycle, the respective relative waiting times delta-T up to the corresponding time slices of the subsequent transmission cycle, a time-slice structure, i.e. time-slice starting times and/or time-slice durations, of the subsequent transmission cycle ideally has already been recognized. After all, the data-rate requirements of a service may change from one time slice to its subsequent time slice, as a result of which a completely different time-slice structure may result for the subsequent transmission cycle as compared to the current transmission cycle.

In order to know future data-rate requirements or encoding-rate requirements, and, thus, the subsequent time-slice structure, for statistical multiplexing, the information signals may already be analyzed in advance. This may result in considerable latency periods. The time diagram of FIG. 9 shows an illustration of this circumstance.

FIG. 9 shows a temporal sequence of processing of an elementary stream 900 incoming for a service on the transmitter side. The data stream 900 is partitioned into portions N−1, N, N+1. The data of the portion N is to be transmitted within a time slice 902-N, and the data of the portion N+1 is to be transmitted within a subsequent time slice 902-(N+1). It may be seen from FIG. 9 that a data-rate analysis 904-(N+1) for the data-stream portion N+1 may have been completed by the time the time slice with the data of the respectively temporally preceding portion is sent, i.e. time slice 902-N. This is due to the fact that, as was already described above, the relative waiting time up to the subsequent time slice 902-(N+1) is integrated in the time slice 902-N. Thus, the data rate analysis for the portion N may already have been completed by the time-slice starting time $T_{N-1}$ of the time slice 902-(N−1), the data-rate analysis of the portion N+1 may already have been completed by the time-slice starting time $T_N$ of the time slice 902-N, etc. This results in a relatively long latency period $T_L$ between the arrival of the data portions N, N+1 of the elementary stream 900 and the corresponding reproduction times or time-slice starting times $T_N$ or $T_{N+1}$.

The above-described long latency period $T_L$ actually contradicts the goals of statistical multiplexing.

SUMMARY

According to an embodiment, an apparatus for transmitting a plurality of information signals in accordance with cyclic time-division multiplexing may have: an estimator configured to estimate, for each of the information signals, a data rate with which the information signal probably will be encoded within a time slice which follows the current time slice; a processor configured to determine, for each of the information signals and on the basis of the estimated data rate, a relative waiting time which indicates an estimated starting time of the subsequent time slice of the information signal; and a time-slice structurer configured to assign an actual starting time to each of the following time slices on the basis of an actual data rate for the information signal, it being possible for the actual data rate to deviate from a data rate estimated by the estimator, each of the actual starting times of the subsequent time slices being larger than or equal to the respectively estimated starting time.

According to another embodiment, a method for transmitting a plurality of information signals in accordance with cyclic time-division multiplexing may have the steps of: estimating, for each of the information signals, a data rate with which the respective information signal probably will be encoded within a time slice which follows the current time slice; determining, for each of the information signals and on the basis of the estimated data rate, a relative waiting time which indicates an estimated starting time of the subsequent time slice of the information signal; and assigning an actual starting time and an actual data rate to each of the following time slices, it being possible for the actual data rate to deviate from an estimated data rate, each of the actual starting times of the subsequent time slices being larger than or equal to the respectively estimated starting time.

Another embodiment may have a computer program for performing the method for transmitting a plurality of information signals in accordance with cyclic time-division multiplexing, which method may have the steps of: estimating, for each of the information signals, a data rate with which the respective information signal probably will be encoded within a time slice which follows the current time slice; determining, for each of the information signals and on the basis of the estimated data rate, a relative waiting time which indicates an estimated starting time of the subsequent time slice of the information signal; and assigning an actual starting time and an actual data rate to each of the following time slices, it being possible for the actual data rate to deviate from an estimated data rate, each of the actual starting times of the subsequent time slices being larger than or equal to the respectively estimated starting time, when the computer program runs on a computer and/or microcontroller.

The finding of the present invention is that the object mentioned above may be achieved in that exact data-rate analysis or encoding-rate analysis of the information signal portions to be transmitted in a subsequent transmission cycle is initially omitted and, instead, on the basis of highly exact estimated values for said subsequent data or encoding rates, estimated values for the relative waiting times delta-T are transmitted within the time slices of a current transmission cycle. Actual data or encoding rates, which may deviate from the estimated data rates for the individual information signals, may be set in the subsequent transmission cycle, as a result of which the predicted time-slice boundaries for the subsequent transmission cycle may shift, however. The possible shift of the time-slice boundaries or the time-slice starting times is subject to several boundary conditions, however. It is important that no time slice of the subsequent transmission cycle starts before its signaled estimated starting time. In this manner, it may be ensured, on the one hand, that a receiver will not "miss" the time slice designated for it. On the other hand, by means of a very exact estimation of the time-slice structure one may achieve that a time slice does not start at a considerably later point in time than was previously signaled, as a result of which receiving power may be saved since the receiver does not have to bring forward its reception time on the off chance. This mainly applies to data or encoding rates of the individual services that are variable only at a relatively slow rate. For constant data rates, the estimated time-slice structure and the actual time-slice structure are even identical, so that in this case the concept introduced takes full advantage of the benefits and the efficiency of time slicing.

In more general terms, one may state that with input quantities for a data-rate estimator that remain constant for all of the information signals from transmission cycle to transmission cycle, such as the information signals themselves and/or a ratio between the coding rate and the quality and/or a ratio between the coding rate and the data-rate cost, the estimated values determined for the relative waiting times match actual waiting times, so that an estimated time-slice starting time derived therefrom and an actual time-slice starting time of the subsequent transmission cycle exactly coincide. In this case, therefore, no power is wasted on the receiver side by switching on the receiver too early.

A time duration of the incoming information signal portions together with estimated or actual encoding rates yields, equivalently, estimated or actual data quantities, respectively, that are transmitted within the various time slices. Thus, one may also speak of estimating data quantities and of determining actual data quantities.

The redistribution of data rates among the various time slices of a transmission cycle is effected in dependence on currently actually used data rates for the individual services as well as in dependence on cost of the individual data rates. This cost may be technical cost, such as computing power, but also monetary cost. This dependence is useful, since otherwise every service would try to extend its time slice—in deviation of the respective estimation—as much as possible in order to gain the largest benefit possible for itself. I.e., in reality, unlimited cooperation of the service providers cannot be assumed, which is why data-rate cost forms an incentive to reduce or increase data rates or time-slice lengths as desired. It is to be noted that in the redistribution all of the time slices are more or less equal, i.e. each time slice has the same possibilities or degrees of freedom available to it in the redistribution as the other time slices, irrespective of its position within the time-slice structure.

Embodiments of the present invention provide an apparatus for transmitting a plurality of information signals within a plurality of current and subsequent time slices in a current and a subsequent transmission cycle in accordance with time-division multiplexing. The inventive apparatus comprises an estimator configured to estimate, for each of the information signals, a data rate with which the information signal probably will be encoded within a time slice which follows the current time slice, to obtain an estimated time-slice structure for the subsequent transmission cycle. In addition, the apparatus comprises a processor configured to determine, for each of the information signals and on the basis of the estimated time-slice structure, a relative waiting time which indicates an estimated starting time of the subsequent time slice of the information signal. A time-slice structurer is provided which is configured to assign an actual starting time to each of the following time slices on the basis of an actual data rate for the information signal so as to obtain an actual time-slice structure, it being possible for the actual data rate to deviate from a data rate estimated by the data rate estimator in the current transmission cycle. The time-slice structurer is configured to select the actual starting times of the subsequent time slices to be larger than or equal to the respectively estimated starting time.

In the event of only slowly variable data rates, or of a good match of estimated and actual data rates, the estimated and the actual time-slice structures are nearly identical. In the event of constant data rates or of a perfect match of estimated and actual data rates, the estimated and the actual time-slice structures are identical, so that a receiver may operate at maximum power efficiency. I.e., the better the estimator, the smaller the deviations between estimated and actual values, so that a receiver will not be switched on before, or only marginally before, a time slice.

Thus, by means of the present invention, the advantages of statistical multiplexing may be combined with the advantages of time slicing and of the delta-T method while wasting a minimum in receiving power at a receiver that relies on the accuracy of the delta-T values signaled.

Advantageous implementations of the present invention are the subject matter of the dependent claims.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
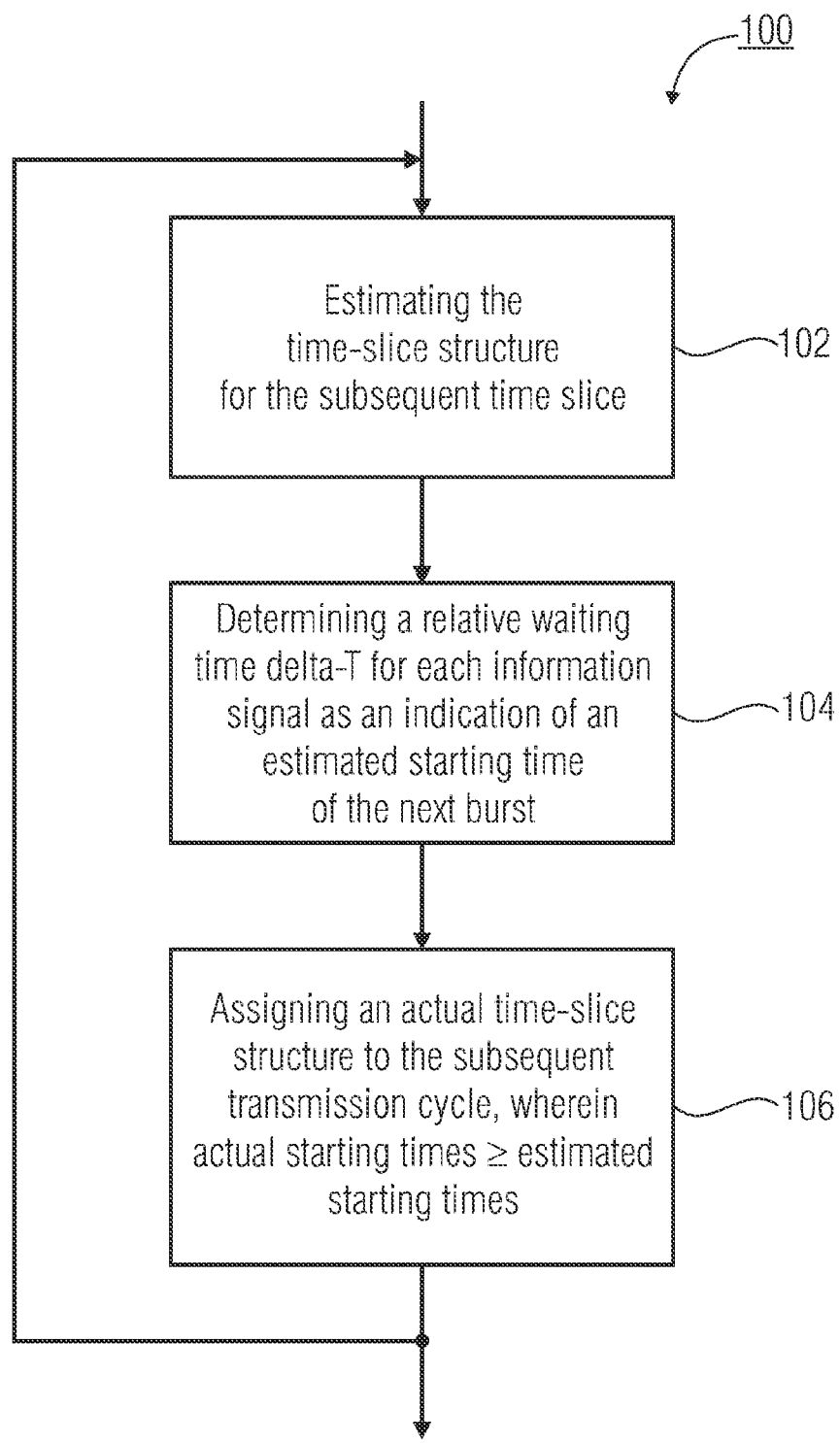
FIG. 1 shows a method of transmitting a plurality of information signals in flexible time-division multiplexing in accordance with an embodiment of the present invention.
Figure 2:
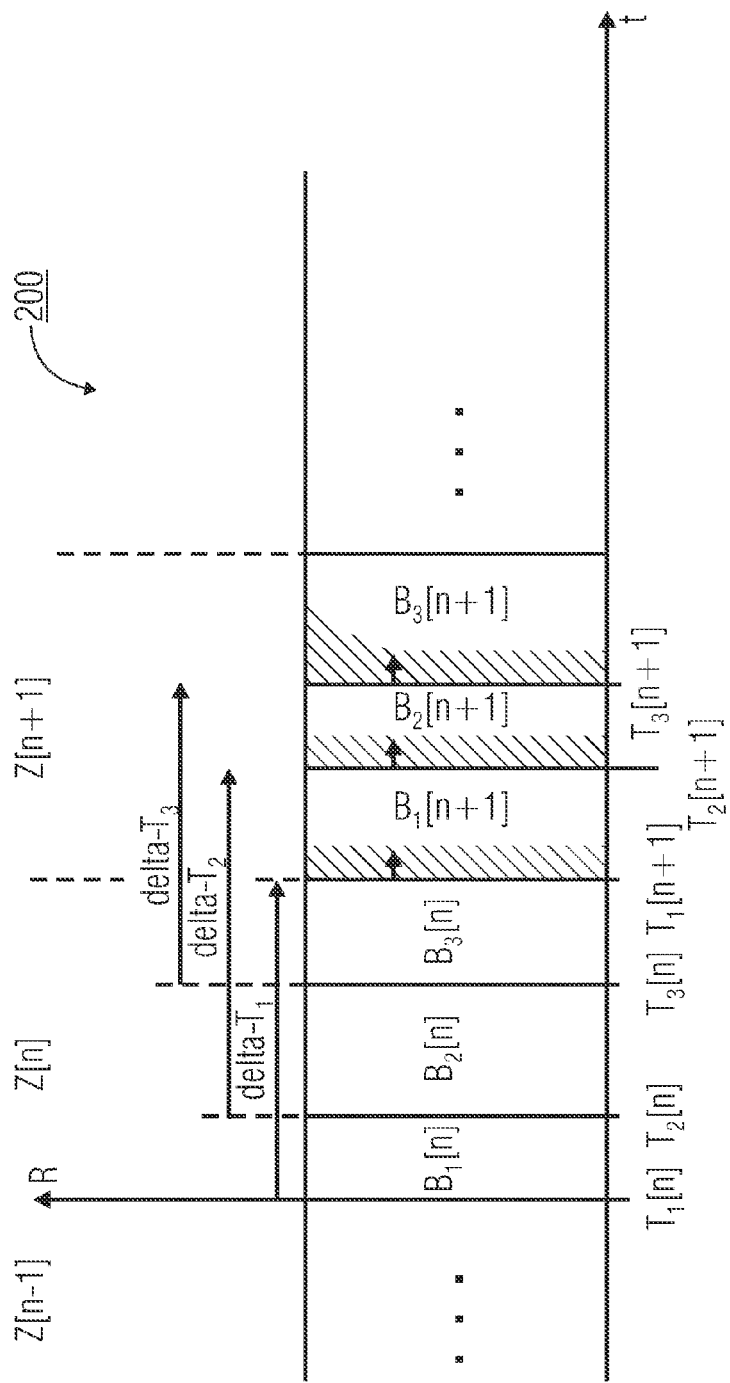
FIG. 2 shows a schematic representation of a plurality of information signals in flexible time-division multiplexing in accordance with an embodiment of the present invention.

Initially, the fundamental concept of the present invention is to be described with regard to FIGS. 1 and 2. To this end, FIG. 1 shows a schematic flowchart of an inventive method 100 for transmitting a plurality of information signals in accordance with statistical time-division multiplexing. The individual method steps of the method 100 of FIG. 1 will now be explained in more detail by means of FIG. 2.

A transport stream 200 shall be assumed, wherein time slices $B_i[.]$ (i=1, ..., I) are arranged or transmitted in time-division multiplexing by a plurality I of service providers. The time slices $B_i[.]$ are arranged in successive transmission cycles { ..., Z[n−1], Z[n], Z[n+1], ... }.

In a first step 102 of the inventive method 100 depicted in FIG. 1, for each of the I time slices $B_i[n]$ (i=1, ..., I) of the $n^{th}$ transmission cycle, a data rate $r_i[n]$ (i=1, ..., I) is estimated with which the respective information signal (in accordance with the service i) is expected to be transmitted within the time slice $B_i[n+1]$ of the $(n+1)^{th}$ transmission cycle which follows the current time slice $B_i[n]$. This results in an estimated time-slice structure for the subsequent transmission cycle Z[n+1]. This estimated time-slice structure comprises estimated time-slice durations and/or time-slice starting times of the subsequent time slices $B_i[n+1]$ (i=1, ..., I).

In a further step 104, a relative waiting time delta-$T_i[n]$, which indicates an estimated starting time $\hat{T}_i[n+1]$ of the subsequent time slice $B_i[n+1]$ of the $i^{th}$ information signal, is determined for the current transmission cycle Z[n] for each of the $i^{th}$ information signals on the basis of the estimated time-slice structure for the subsequent transmission cycle Z[n+1].

In a subsequent step 106, each of the subsequent time slices $B_i[n+1]$ (i=1, ..., I) has an actual starting time $T_i[n+1]$ and an actual data rate $r_{eff,i}[n+1]$ (i=1, ..., I) assigned to it so as to obtain an actual time-slice structure for the subsequent transmission cycle Z[n+1]. The actual data rate $r_{eff,i}[n+1]$ may deviate both in the downward and in the upward directions from the data rate $r_i[n]$ that has been estimated and transmitted in the transmission cycle Z[n]. In step 106, the actual starting times $T_i[n+1]$ are selected such that each of the actual starting times $T_i[n+1]$ of the subsequent time slices $B_i[n+1]$ is larger than or equal to the starting times $\hat{T}_i[n+1]$ (i=1, ..., I) that have been previously estimated in each case. I.e., $T_i[n+1] \geq \hat{T}_i[n+1] = T_i[n] + \text{delta-}T_i[n]$. In other words, this means that a time slice $B_i[n+1]$ can never start prior to its starting time $\hat{T}_i[n+1]$ signaled within the previous time slice $B_i[n]$.

In the event of only slowly variable data rates $r_{eff,i}[n]$ or of a good match of estimated and actual data rates $r_i[n]$, $r_{eff,i}[n]$ the estimated and actual time-slice structures are almost identical, i.e. $T_i[n] \approx \hat{T}_i[n]$. In the event of constant data rates or of a perfect match of estimated and actual data rates, the estimated and the actual time-slice structures are identical, i.e. $T_i[n] \approx \hat{T}_i[n]$, so that a receiver may operate at maximum power efficiency. I.e., the better the estimating 102, the smaller the deviations between estimated and actual values $r_i[n]$, $r_{eff,i}[n]$ and $T_i[n]$, $\hat{T}_i[n]$, respectively, so that a receiver will not be switched on before, or only marginally before, a time slice $T_i[n]$ (i=1, ..., I). Naturally, $T_i[n] \approx \hat{T}_i[n]$ may also apply with rapidly variable data rates, i.e. a change between two successive cycles Z[n], Z[n+1], if the estimation or the prediction 102 provides correspondingly accurate estimated values.

Before the inventive concept will be described in more detail in the following paragraphs, the mathematical symbols used in this specification shall initially be explained:

I number of services in DVB-H multiplexing
$\{S_1, S_2, ..., S_i, ..., S_I\}$ the quantity of services of DVB-H multiplexing
$\{B[1], B[2], ..., B[n], ...\}$ the quantity of the temporally linear sequence of the time slices of all the services in DVB-H multiplexing
$\{B_i[1], B_i[2], ..., B_i[n], ...\}$ the quantity of the temporally linear sequence of all time slices belonging to the service $S_i$
r[n] signaled rate requirement of the time slice B[n]
$r_{eff}[n]$ effective data rate of the time slice B[n]
$r_w[n]$ desired rate of the time slice B[n]
$J_{max}$ maximum time jitter for the beginning of the time slice
$\Delta T[n]$ delay of the start of the time slice B[n] as compared to the signaled start
$\Delta T_{max}[n]$ maximally possible delay as compared to the signaled start of the time slice B[n]
$\Delta t[n]$ temporal change in the time slice length of the time slice B[n]
f(i;n) calculates the linear time-slice number of the time slice $B_i[n]$
$f_S^{-1}(n)$ determines the number of the service with which the time slice B[n] is associated
$f_n^{-1}(n)$ determines the time-slice number while exclusively considering the time slices of the service $S_{f_S^{-1}(n)}$
c cost per second of transmission capacity
u[n] utility function (payout function) for the associated service at the time of the time slice B[n]

Figure 3:
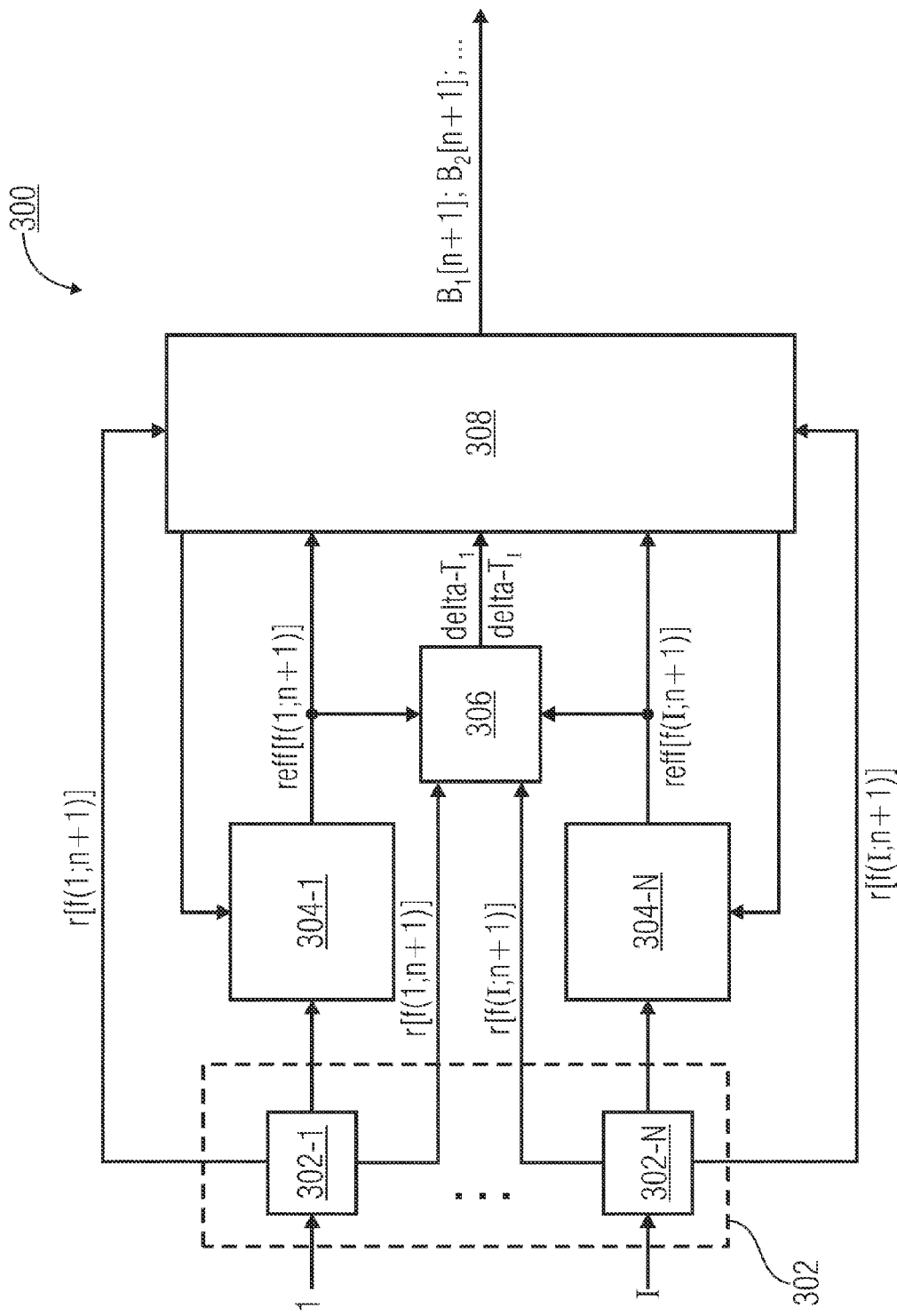
FIG. 3 shows a block diagram of an apparatus for transmitting a plurality of information signals in flexible time-division multiplexing in accordance with an embodiment of the present invention.

An apparatus 300 for transmitting a plurality of information signals 301-i (i=1, ..., I) in a plurality of current and subsequent time slices B[n], $B_i[n+1]$ (i=1, ..., I) in a current and a subsequent transmission cycle Z[n], Z[n+1] in accordance with time-division multiplexing shall now be described by means of FIG. 3.

The apparatus 300 comprises an estimator or predictor 302 configured to estimate, for each of the information signals 301-i, a data rate r[f(i;n+1)] with which the information signal 301-i in the time slice $B_i[n+1]$ following the current time slice $B_i[n]$ is presumably encoded by an associated encoder 304-i (i=1, ..., I) so as to obtain an estimated time-slice structure for the subsequent transmission cycle Z[n+1].

The apparatus 300 comprises a processor 306 configured to determine, for each of the information signals 301-i, on the basis of the estimated time-slice structure or the estimated data rates r[f(i;n+1)] (i=1, ..., I), a relative waiting time delta-$T_i$ which indicates an estimated starting time $\hat{T}_i[n+1]$ of the subsequent time slice $B_i[n+1]$.

What is also provided is a time-slice structurer 308 configured to assign, to each of the subsequent time slices $B_i[n+1]$, an actual starting time $T_i[n+1]$ on the basis of an actual data rate $r_{eff}[f(i;n+1)]$ for the information signal 301-i so as to obtain an actual time-slice structure, it being possible for the actual data rate $r_{eff}[f(i;n+1)]$ to deviate from a data rate r[f(i;n+1)] (i=1, ..., I) estimated by the data rate estimator 302 in the transmission cycle Z[n]. The time-slice structurer 308 is configured to select the actual starting times $T_i[n+1]$ of the subsequent time slices $B_i[n+1]$ to be larger than or equal to the starting time $\hat{T}_i[n+1]$ estimated in the preceding transmission cycle Z[n], such that an actual starting time never comes before an estimated starting time. I.e., $T_i[n+1] \geq \hat{T}_i[n+1]$. Ideally, i.e. when $r[f(i;n+1)] = r_{eff}[f(i;n+1)]$, then $T_i[n+1] = \hat{T}_i[n+1]$ shall apply.

The actual data rates $r_{\it eff}[f(i;n+1)]$ with which the information signals 301-$i$ in the transmission cycle Z[n+1] are actually encoded by encoders 304-$i$ (i=1, ..., I) result from desired or advantageous data rates $r_w[f(i;n+1)]$ and various further boundary conditions, which will be explained below.

In accordance with embodiments, the processor 306, therefore, is configured to assign each of the current time slices $B_i[n]$ an actual starting time $T_i[n]$ on the basis of an actual data rate $r_{\it eff}[f(i;n)]$ for an information signal 301-$i$ associated with the current time slice so as to obtain an actual time-slice structure for the current time slice, it being possible for the actual data rate $r_{\it eff}[f(i;n)]$ to deviate from a data rate $r[f(i;n)]$ estimated by the estimator 302 in a preceding transmission cycle Z[n−1], so as to determine the relative waiting time delta-$T_i[n]$ for each of the information signals on the basis of the estimated time-slice structure the subsequent transmission cycle Z[n+1] and of the actual time-slice structure for the current transmission cycle Z[n].

In accordance with embodiments, the processor 308 is further configured to incorporate each of the relative waiting times delta-$T_i[n]$ that have been determined in a current time slice $B_i[n]$ of an associated information signal 301-$i$ so as to transmit them to a remote-side receiver for the multiplex signal resulting from the multiplexed time slices $B_i[n]$ (i=1, ..., I). As compared to a conventional system wherein delta-T values are transmitted, this, therefore, is currently about estimated values for actual delta-T values that are not yet known in the current transmission cycle Z[n] since the corresponding signal portions of the subsequent cycle Z[n+1] have not yet been analyzed. This results in a shorter latency period between the input of the signal portions and the transmission of their encoded versions within the time slices.

Even though the inventive concept enables shifting of the previously estimated time-slice starting times $T_i[n+1]$ back in time, as will be explained later on, as exact an estimation as possible of the delta-T values and, thus, of the starting times $T_i[n+1]$ (i=1, ..., I) is advantageous since it is only with estimated values $\hat{T}_i[n+1]$ having little deviation that a receiver is able to work in a power-efficient manner.

In accordance with embodiments, the data rate estimator 302 is configured to estimate a data rate $r[f(i;n+1)]$ of an information signal 301-$i$ for the subsequent time slice $B_i[n+1]$ at least on the basis of preceding and/or current actual data rates $\{r_{\it eff}[f(i;1)], r_{\it eff}[f(i;2)], \ldots, r_{\it eff}[f(i;n)]\}$, of preceding and/or current advantageous data rates $\{r_w[f(i;1)], r_w[f(i;2)], \ldots, r_w[f(i;n)]\}$, and preceding estimated and/or signaled data rates $\{r[f(i;1)], r[f(i;2)], \ldots, r[f(i;n)]\}$ of the information signal 301-$i$. It may be a causal predictor that outputs, by observing the past rate requirement of all of the information signals of the $i^{th}$ information signal 301-$i$, an estimated value for the requirement needed within the next time slice $B_i[n+1]$ (i=1, ..., I). The estimated value $r[f(i;n+1)]$ may depend on the past data rates signaled, the past data rates desired and the past actual data rates of the $i^{th}$ information signal 301-$i$ (i=1, ..., I).

A predictive estimator 302 may be realized, in accordance with an embodiment, by the following specification, for example:

$$r[f(i; n+1)] = \begin{cases} r_w[f(i;n)] + \alpha \cdot r_{\it eff}[f(i;n)]; & \text{if } r_{\it eff}[f(i;n)] > r[f(i;n)] \\ r_w[f(i;n)]; & \text{else} \end{cases} \quad (1)$$

Here, $r[f(i;n)]$ designates the data rate signaled of the current time slice $B_i[n]$ (that was already estimated in the cycle Z[n−1]), and $r[f(i;n+1)]$ designates the estimated data rate of the following time slice of the $i^{th}$ service $S_i$. $r_w[f(i;n)]$ is the advantageous data rate for the time slice $B_i[n]$, whereas $r_{\it eff}[f(i;n)]$ is the ultimately allocated or actual data rate for the time slice $B_i[n]$. The compensation factor $\alpha \in [0;1)$ regulates the degree of error compensation.

A person skilled in the art will readily appreciate that the predictive estimator 302 described by means of equation (1) is merely exemplary and may quite possibly be realized differently. Algorithms for implementing predictors are known from specialized literature, which is why they will not be addressed in more detail here. As has already been emphasized several times, the quality of the estimated values $r[f(i;n+1)]$ (i=1, ..., I) is decisive for the power consumption that may be achieved at the receiver.

Embodiments of the present invention realize flexible time-division multiplexing wherein it is possible, in principle, to change the data quantity of the individual time slices $B_i[n]$ within certain limits, even though the time-slice starting times $T_i[n]$ concerned or their estimated values $\hat{T}_i[n]$ were already signaled to the receivers by means of the delta-T method (delta-$T_i[n-1]$). The inventive concept is based on a possible extension of time slices $B_i[n]$ into the neighboring following time slices $B_{i+1}[n]$, $B_{i+2}[n]$, etc. The inventive concept allows a redistribution of the data rates of the individual services or information signals 301-$i$ within certain limits.

The time-slice extension shall be explained below by means of a simple example: a time slice of a service $S_2$ and $S_3$ shall be contemplated, respectively, that directly follow each other within the transmission cycle contemplated. If it is found that the data rate of the service $S_2$ that was determined and signaled previously, i.e. in a preceding transmission cycle, is too low for the current time slice, and that, equally, that of $S_3$ is too high, the duration of the time slice of $S_2$ could be extended by a certain amount. In this case, $S_2$ would be able to transmit the desired data, and the data rate of $S_3$ would decrease to a lower level. However, for $S_3$ this entails the disadvantage that the start of the time slice of $S_3$ is later than was previously signaled. In this case, the receiver expecting the service $S_3$ would be activated too soon and, thus, receiving power would be wasted.

In a further example it shall be assumed that the data rate of $S_3$ is not to be changed after all. The additional data rate entailed by $S_2$ is to be provided, in this example, by $S_4$ instead. The time slice of $S_4$ immediately follows that of $S_3$. In this case, the time slice of $S_2$ could be extended,
the time slice of $S_3$ could then be shifted, in total, by the extended time interval, and
the time slice of $S_4$ could be shortened accordingly.

Figure 4:
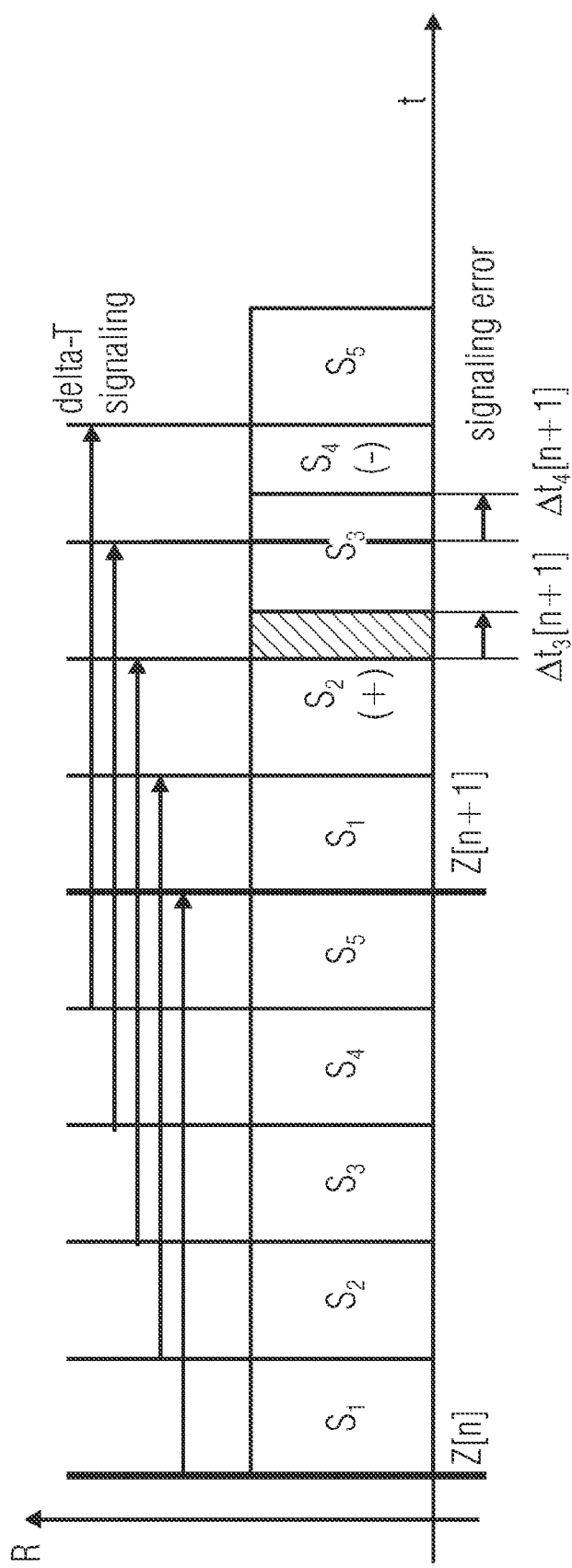
FIG. 4 shows a schematic representation of a shift of time-slice starting times.

These exemplary circumstances are depicted in FIG. 4. In this example, too, the data rates may be redistributed successfully. A start of the time slice that is behind schedule by $\Delta t_3$ and $\Delta t_4$, respectively, results both for $S_3$ and for $S_4$. It becomes apparent that for an exchange of data rates between two different services, the time slices of all of the intermediate services (here: $S_3$) are reproduced behind schedule.

The following paragraphs shall provide an explanation of the conditions underlying the exchange of data rates between different time slices.

To this end, the chronology of successive time slices B[1], ..., B[n], ..., whose estimated starting times were already signaled to the receivers by means of the delta-T method, is contemplated. For each time slice B[n], the time-slice duration is changed by the value $\Delta t[n]$.

Thus the time-slice duration is changed by the value Δt[n]. This results in the following deviation from the estimated starting time of the time slice B[n]:

$$\Delta T[n] = \sum_{j=1}^{n-1} \Delta t[j] \quad (2)$$

As a boundary condition for further, subsequent observations, the fact that a time slice B[n] may never start before its estimated or signaled starting time results in the following:

$$\Delta T[n] \geq 0 \forall n \in N \quad (3)$$

If the above-described redistribution of the data rate is regarded as a game as defined by game theory, it becomes apparent that in order to obtain maximum benefit all of the participants in the game are to cooperate, since otherwise the optimum strategy for each participant would consist in extending their time slices by a maximum amount so as to be able to accommodate as high data rates as possible. To avoid this obligation to cooperate as a prerequisite for functional flexible multiplexing, the following restricting rules are therefore introduced for redistributing the data rate:

1. If a time slice B[f(i;n)] is extended by Δt[f(i;n)], it should be possible for the service $S_i$ to compensate for said extension within the subsequent time slice B[f(i;n+1)], i.e. the scheduled time-slice duration of the subsequent time slice B[f(i;n+1)] should be longer than Δt[f(i;n)]. To this end, the time-slice structurer 308 is configured, in accordance with embodiments, to assign each of the current time slices B[f(i;n)] an actual starting time and an actual data rate $r_{eff}$[f(i;n)] that may deviate from a previously estimated data rate r[f(i;n−1)], and to change a duration of a current time slice by a differential time duration Δt[f(i;n)] only when an estimated duration of the subsequent time slice B[f(i;n+1)] is longer than the differential time duration Δt[f(i;n)].

2. The actual change Δt[f(i;n)] of the current time-slice length, i.e. the differential time duration, is determined, while observing inequality (3), by the following:

$$\Delta t[f(i;n)] = \max(\Delta t_w[f(i;n)] - \max(\Delta t_w[f(i;n-1)];0)]; -\Delta T[f(i;n)]) \quad (4)$$

In this context, $\Delta t_w$[f(i;n)] designates a desired or advantageous differential time duration of the current time slice B[f(i;n)]. The advantageous differential time duration $\Delta t_w$[f(i;n)], which directly depends on the advantageous data rate $r_w$[f(i;n)] for the current time slice B[f(i;n)], additionally results, in accordance with embodiments, from the data-rate cost, such as a price per data rate unit, for example. This will be addressed in more detail below. The advantageous differential time duration $\Delta t_w$[f(i;0)] for the respectively first time slice B[f(i;0)] of the service $S_i$ shall be assumed to be zero, i.e. $\Delta t_w$[f(i;0)]=0. To realize equation (4), the time-slice structurer 308 is configured, in accordance with an embodiment, to determine the differential time duration Δt[f(i;n)] as a function of a differential time duration $\Delta t_w$[f(i;n)] resulting from an advantageous data rate for the current time slice, of a differential time duration $\Delta t_w$[f(i;n−1)] resulting from a data rate that is advantageous for the preceding time slice, and of a delay ΔT[f(i;n)] of the actual starting time T[f(i;n)] as compared to a starting time $\hat{T}_i$[n] estimated in the preceding transmission frame.

Equation (4) describes more or less the data rate exchange between two successive time slices B[f(i;n−1)] and B[f(i;n)] (or B[f(i;n)] and B[f(i;n+1)]). If the preceding time slice B[f(i;n−1)] was already extended by $\Delta t_w$[f(i;n−1)], this extension time duration is subtracted, in accordance with equation (4), from the currently desired differential time duration $\Delta t_w$[f(i;n)]. This may be interpreted to the effect that data rate debts of the preceding time slice B[f(i;n−1)] are settled in the subsequent time slice B[f(i;n)]. If the preceding time slice was, therefore, extended ($\Delta t_w$[f(i;n−1)]>0), this extension time is subtracted, in accordance with equation (4), from the desired extension $\Delta t_w$[f(i;n)] of the current time slice B[f(i;n)] so as to obtain the actual change Δt[f(i;n)] of the time-slice length. The actual change Δt[f(i;n)] of the time-slice length may of course also be negative, which corresponds to a shortening of the time slice B[f(i;n)]. In addition, equation (4) expresses that the current time slice B[f(i;n)] may not be shortened by more than the overall delay ΔT[f(i;n)] so as not to infringe upon inequality (3), i.e. Δt[f(i;n)]≥−ΔT[f(i;n)]. The time-slice structurer 308 is therefore configured, in accordance with an embodiment, to select the differential time duration Δt[f(i;n)] of a time slot B[f(i;n)] of an information signal to be longer than a negative accumulated overall delay time −ΔT[f(i;n+1)] of preceding time slices of a transmission cycle.

3. A maximally possible delay $\Delta T_{max}$[f(i;n)] of the beginning of the time slice, said delay being known for all n, be defined for each time slice B[f(i;n)]. This maximally possible delay $\Delta T_{max}$[f(i;n)] may be determined, for example, from the capacity utilization of the jitter buffers of the respective service $S_i$. Thus, no time slice B[f(i;n)] should be delayed more than is allowed by $\Delta T_{max}$[f(i;n)]. When taking into account known and estimated shifts of neighboring time slices, a further boundary condition results for the actual change Δt[f(i;n)]:

$$\Delta t[f(i;n)] \leq \min_{m=f(i;n)+1}^{f(i;n+1)} (\Delta T_{max}[m] - \Delta \tilde{T}[m;n]) \forall i \in [1;N], n \in N \quad (5)$$

For inequality (5) to be fulfilled, the desired change $\Delta t_w$[f(i;n)] of the time-slice duration may be selected accordingly. I.e., on the basis of inequality (5), the various services $S_i$ (i=1, . . . , I) may trade with data rates among each other so as to meet the boundary condition expressed by said inequality for each time slice and each transmission cycle. The function $\Delta \tilde{T}$[m; n] represents an auxiliary function that estimates future shifts, i.e. shifts that have not yet taken place, of neighboring time slices. Let n be the number of the current time slice, and let m be the number of a neighboring time slice, the shift of which is to be estimated. In this case, let the function be defined by the following:

$$\Delta \tilde{T}[m;n] = \sum_{l=1}^{m-1} \Delta \tilde{t}[l;n] \quad (6)$$

$$\Delta \tilde{t}[l;n] = \begin{cases} \Delta t[l] & \text{if } l < n \\ \max(-\max(\Delta t_w[prev(1)];0];\Delta \tilde{T}[l;n]) & \text{if } l \geq n \text{ and } prev(1) < n \\ 0 & \text{else} \end{cases}$$

$$prev(n) = f(f_s^{-1}(n); f_n^{-1}(n)-1)$$

Thus, inequality (5) in connection with equation (6) states that each time slice may be extended, at a maximum, only to such an extent that for none of the neighboring time slices in the transmission cycle, the maximally possible delay $\Delta T_{max}$ thereof is exceeded. In the estimation of $\Delta\tilde{T}[m; n]$, the time-slice changes ($1 \leq n$), which have already been known, of previously contemplated or changed time slices, and time slices ($1 > n$ and $\text{prev}(1) < n$)—that are still to be changed—of the transmission cycle are to be taken into account, of course. For the time slices B[m] still to be contemplated, the corresponding estimated value $\Delta\tilde{T}[m; n]$ for the change is determined from the change of the time slice $f_i^{-1}(m)$ of the preceding transmission cycle, said $f_i^{-1}(m)$ corresponding to the associated service $f_S^{-1}(m)$. This estimation is based on the assumption that the data rate that was subtracted or added in the preceding transmission cycle will be reclaimed or returned in the current transmission cycle. Thus, in the estimation in accordance with equations (5) or (6), the principle of data rate borrowing is employed as well.

4. Each time slice B[f(i;n)] for which $\max(\Delta t_w[f(i;n-1)]; 0) < \Delta T[f(i;n)]$ applies may alternatively also be shortened, i.e. $\Delta t_w[f(i;n)] < 0$. Here, inequality (3) may again be contemplated as a boundary condition, the minimum desired temporal change $\Delta t_w[f(i;n)]$ results from an insertion into the equation (4):

$$\Delta t_{w,min}[f(i;n)] = \max(\Delta t_w[f(i;n-1)]; 0) - \Delta T[f(i;n)] \quad (7)$$

As was already described above, equation (7) expresses that the change $\Delta t[f(i;n)]$ of the time-slice length may not be selected such that a time slice B[f(i;n)] may begin prior to its previously signaled or estimated starting time. $\Delta t_{w,min}$ in accordance with equation (7) expresses precisely this.

The above rules 1-4 signify a) that each time slice B[f(i;n)] can bring forward so much data rate from its own future time slice B[f(i;n+1)] as may be compensated by the other services by means of their jitter buffers, b) that the delay $\Delta T[n]$ that has already been accumulated during each time slice may be partly or fully compensated for by shortening the time-slice lengths of other services.

As was already indicated, the desired changes $\Delta t_w[f(i;n)]$ of the time-slice lengths result, in accordance with embodiments, from an interplay of data rates $r_w[f(i;n)]$ desired or advantageous by the encoders 304-i and of data-rate cost, for example in the form of a price per data rate unit. I.e., in accordance with embodiments, the time-slice structurer 308 is configured to set each of the actual data rates $r_{eff}[f(i;n)]$ of a transmission cycle in dependence on the information signal 301-i currently to be transmitted, and on data-rate cost.

The change $\Delta t[f(i;n)]$ in the time-slice lengths is to be assigned a payout function. For services $S_i$, which extend a time slice $B_i[n]$ or B[f(i;n)], a negative payout function shall be defined. This negative payout is paid out (positively) in equal parts to all of the services $S_j$ ($j \neq i$), the time slices of which have been shifted by this extension $\Delta t[f(i;n)]$. However, if a time slice is shortened ($\Delta t[f(i;n)] < 0$), the service that now transmits fewer bits will obtain a payout equivalent for this reduction of the shift.

This shall be explained below for a proportional cost function. A constant price c shall be specified per second of transmission time. If a time slice B[n] belonging to the service $S_i$ is extended by $\Delta t[n]$, the other services will receive the following payout for all of the time slices transmitted between B[f(i;n)] and B[f(i;n+1)], i.e. $B[x] \forall x \in [n+1; f(f_S^{-1}(n); f_n^{-1}(n)+1]$:

$$u[x] = c \cdot \Delta t[n] \quad (8)$$

If several time-slice extensions are superimposed, the following payout function results therefrom:

$$u[n] = c \cdot \sum_{x=1}^{n-1} \Delta t[x] = c \cdot \Delta T[n] \quad (9)$$

The (negative) payout function for the service whose time slice is extended may be determined from equation (8):

$$u[n] = -c \cdot \Delta t[n] \cdot (f(i;n+1) - f(i;n)) \quad (10)$$

If a time slice is shortened, i.e. ($\Delta t[n] < 0$), and if an existing overall shift is thus fully or partly compensated for, the service at whose expense the shortening was made will receive an additional payment for the compensation:

$$u[n] = \frac{-\Delta t[n]}{\Delta T[n]} \cdot c \cdot \sum_{m=n+1}^{\infty} \Delta \tilde{T}[m; n] \quad (11)$$

Thus, the overall payout per time slice results in:

$$u[n] = c \cdot \Delta T[n] \cdot \begin{cases} 1 - \frac{\Delta t[n]}{\Delta T[n]} \cdot (f(i; n+1) - f(i; n)) & \text{if } \Delta t[n] \geq 0 \\ 1 - \frac{\Delta t[n]}{\Delta T[n]^2} \cdot \sum_{m=n+1}^{\infty} \Delta \tilde{T}[m; n] & \text{else} \end{cases} \quad (12)$$

In accordance with embodiments of the present invention, the time-slice structurer 308 is therefore configured to set each of the actual data rates $r_{eff}[f(i;n)]$ in dependence on the information signal 301-i actually to be transmitted within the associated time slice, and on data-rate cost c. Each of the information signals 301-i may be credited with a value u[f(i; n)] dependent on the data-rate cost c when the time slice B[f(i;n)] of the information signal 301-i is shortened ($\Delta t[f(i;n)] < 0$), and a value u[f(i;n)] dependent on the data-rate cost may be subtracted when the time slice B[f(i;n)] of the information signal 301-i is extended, i.e. $\Delta t[f(i;n)] > 0$.

Figure 5:
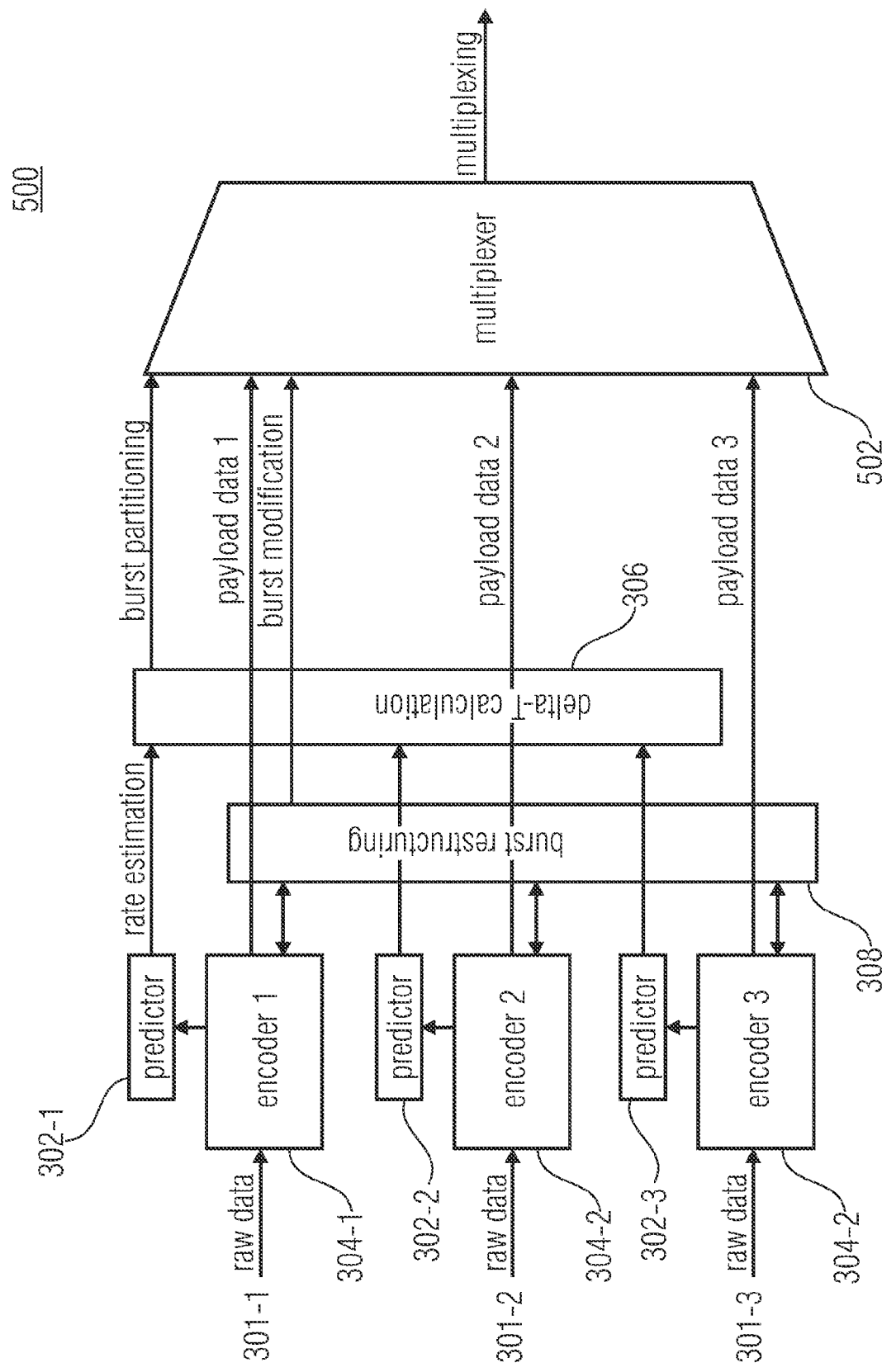
FIG. 5 shows a schematic representation of a flexible multiplex system in accordance with an embodiment of the present invention.

An overall system for transmitting the plurality of information signals 301-i in flexible multiplexing is shown in summary in FIG. 5.

In FIG. 5, the system is represented for three services by way of example. The encoders 304-i transmit the status data regarding the incoming information signals 301-i to the predictor blocks 302-i, so that a data-rate estimation as was previously described may be performed. On the basis of this data-rate estimation, the future delta-T values are subsequently calculated. They are integrated into a bit stream by a DVB-H multiplexer 502 and are subsequently transferred to DVB-H terminals, for example. To this end, the encoders 304-i may perform, via the time-slice structurer 308, short-term changes in the DVB-H time-slice partitioning. The block 308 may be designed as a central unit, as is depicted in FIG. 5, or it may be designed to be decentralized. I.e., the time-slice structurer 308 might be split up among the individual service providers, so that each service provider (re)structures its associated time slice—however, while taking into account the known past or estimated restructuring of the respective other services that is still to be performed (see equation (6)). Thus, in this case, at least linking of the decentralized restructuring units will be used. In each case, boundary conditions and specifications as have been previously described by way of example are observed in the redistribution.

Each redistribution is initiated by an individual encoder 304-$i$. In principle, an initiating encoder may select between an extension and a shortening of a time slice. With the aid of the payout function u[.], which was defined above, the encoder 304-$i$ may determine the cost and/or the benefit of a time-slice extension or shortening. In this manner, it has an assessment tool available to it for controlling its own data-rate requirement.

Figure 9:
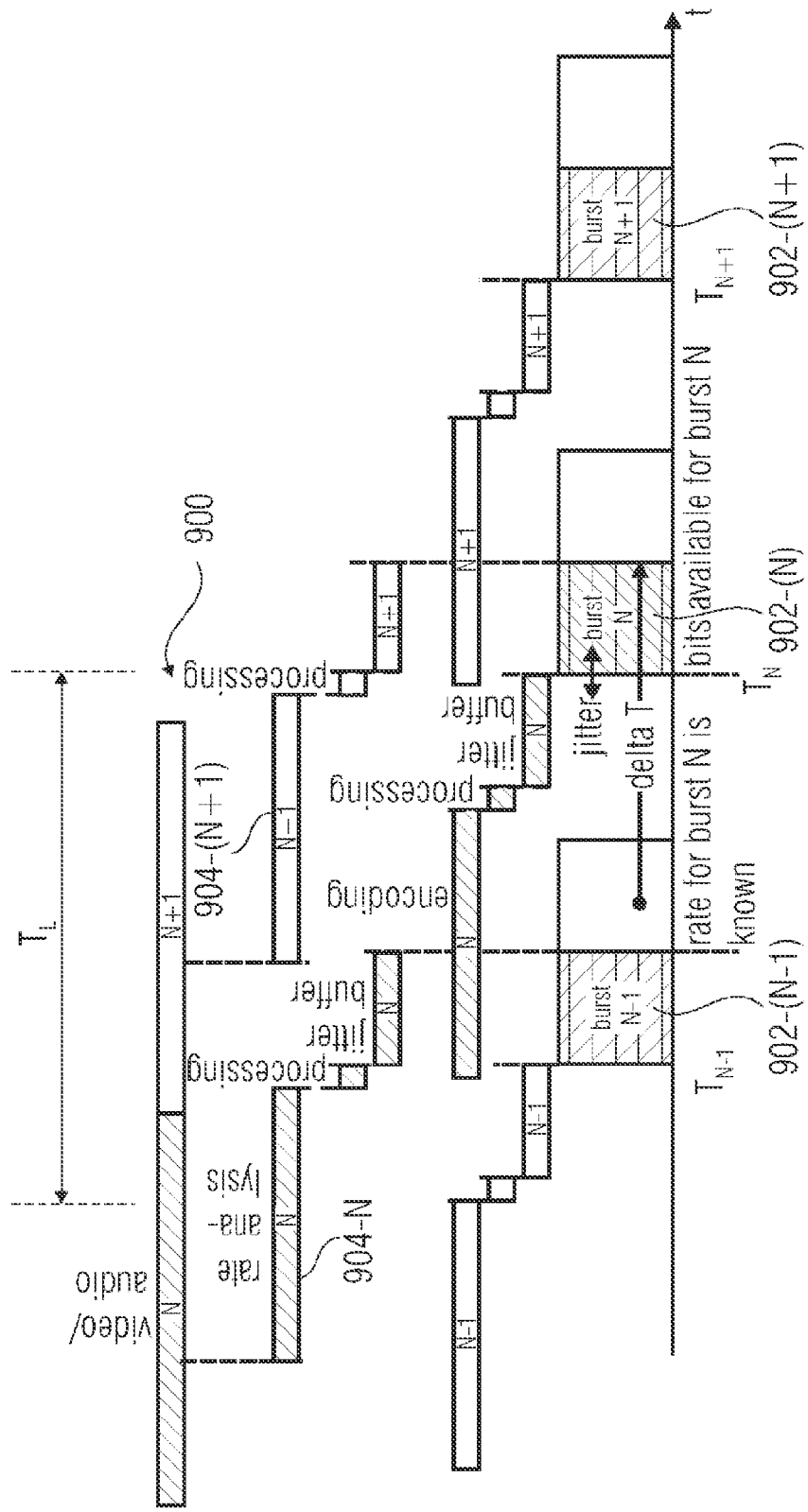
FIG. 9 shows an example of a time flow of a service with a variable data rate in conventional statistical multiplexing.

The proposed inventive concept shortens a latency period or end-to-end delay $T_L$, which was already described at the outset with reference to FIG. 9, such that the moment when the actual data-rate splitting may be known is moved closer to the reproduction time of the actual payload data. This relationship is shown in FIG. 6.

Figure 6:
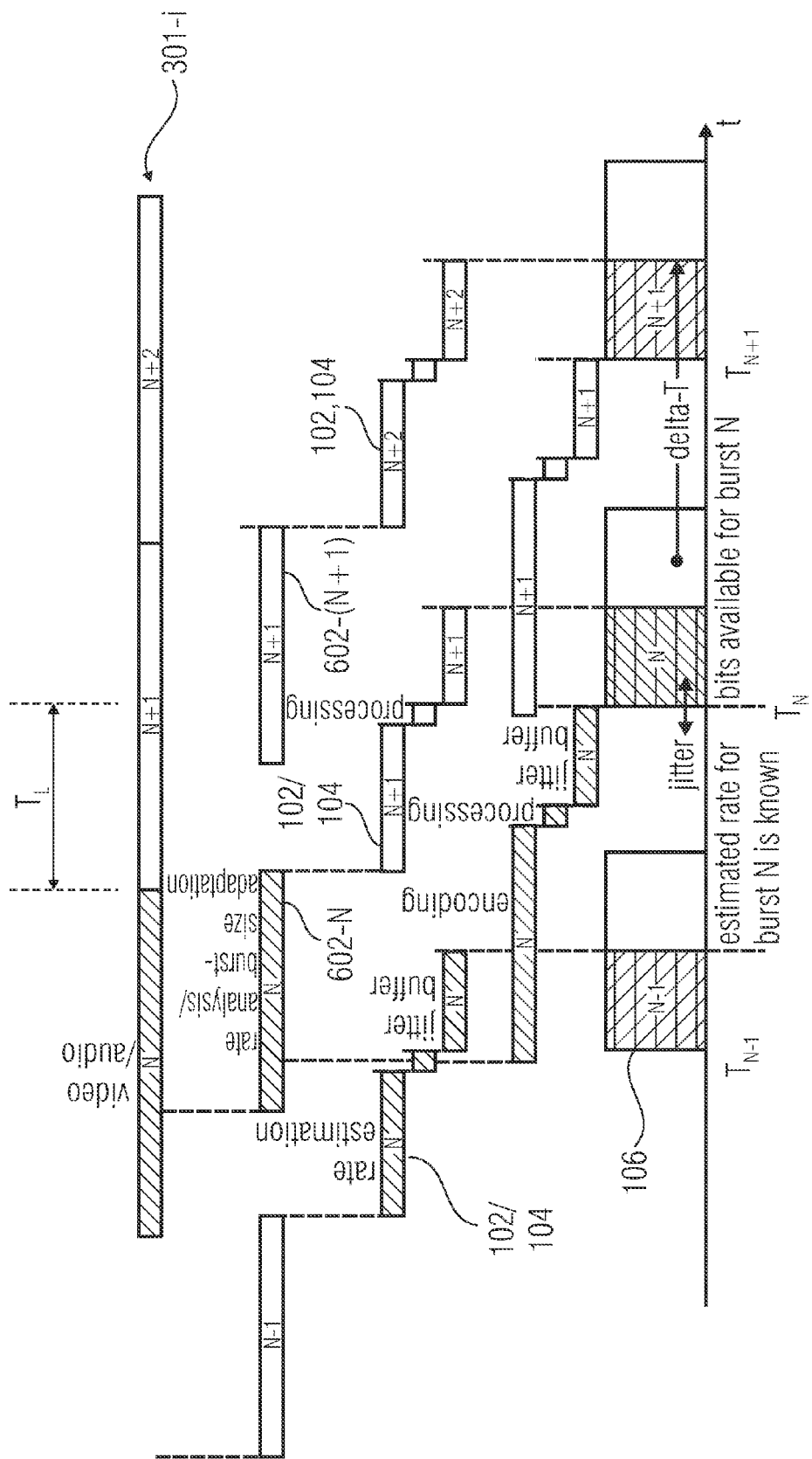
FIG. 6 shows a timing diagram of a flexible multiplexing technique in accordance with an embodiment of the present invention.
Figure 7:
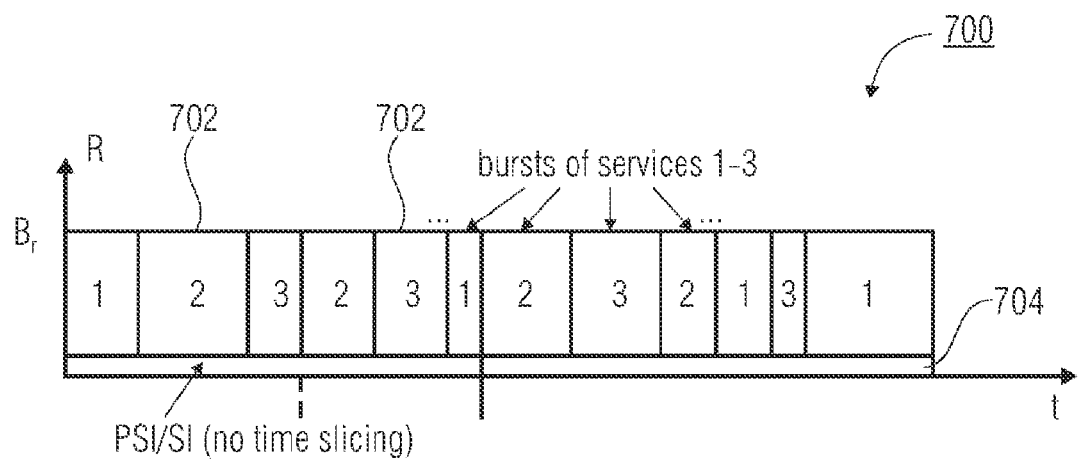
FIG. 7 shows an example of an architecture of a DVB-H multiplex.
Figure 8:
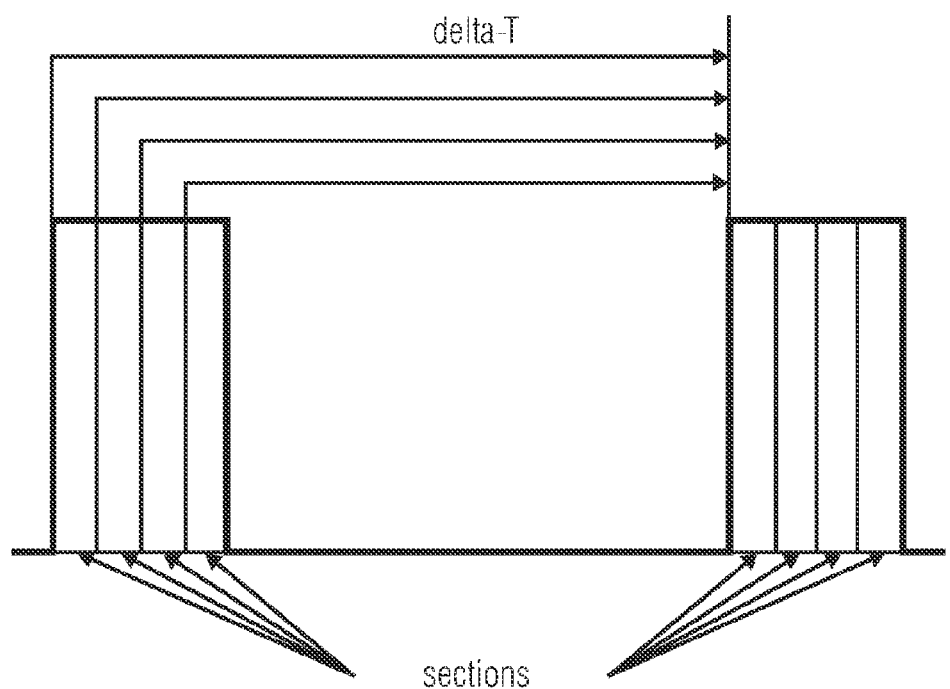
FIG. 8 shows delta-T signaling taken from the European telecommunication standard ETSI EN 302 304.

FIG. 6 shows an information signal 301-$i$ split up into various information signal portions N−1, N, N+1, N+2, . . . . As for the information signal portion N, one may recognize that the moment at which the data-rate analysis 602-N of the $N^{th}$ information signal portion is completed has moved closer to the reproduction time $T_N$ of the $N^{th}$ time slice as compared to FIG. 9 described at the outset. This is due to the fact that a data-rate analysis 602-(N+1) is not needed for the subsequent information signal portion N+1 at the reproduction time $T_N$, but that, instead, an estimation 102, 104 of the delta-T values to be transmitted within the time slice N is performed for the portion N+1. This estimation is less costly and does not require the subsequent information signal portion N+1, but may be performed, as was already described, by using past and current information signal portions (equations (1) and (2)).

Finally, it shall be noted that the bit stream generated by the inventive concept may be processed in a fully transparent manner by a terminal (e.g. DVB-H terminal) conforming to standard.

The inventive concept introduced may be employed, for example, in a data-rate trading system as will be described below. In such a system, data rates within a network, in particular within a DVB-H network, are distributed among information signal and service providers of the network via a trading system, similar to a market place. A trading platform with data-rate acquisition devices or software agents and a data-rate allocation device or a data-rate agent is used for controlling data rates of the individual information signal providers. Participants in the trading platform are the software agents or the data-rate acquisition devices. On behalf of the information signal providers, they take on trading with data rates of the multiplex, and in this manner they acquire transmission capacities for the information signal services assigned to them.

It shall be noted that the present invention is not limited to the respective components of the devices or to the procedure explained, since said components and methods may vary. The terms used here are merely intended to describe specific embodiments, and are not used in a limiting sense. If quantities or indefinite articles are used in the description and in the claims, they also refer to the plurality of said elements, unless clearly otherwise indicated by the overall context, and vice versa.

Even though DVB-H networks are particularly suitable for the inventive concept since DVB-H transmits any data streams in the form of IP datagrams, the inventive concept is not limited to DVB-H networks.

In particular, it shall be noted that, depending on the circumstances, the inventive concept may also be implemented in software. The implementation may be on a digital storage medium, in particular a DVD, CD or disk with electronically readable control signals that may cooperate with a programmable computer system and/or microcontroller such that the corresponding method of transmitting the plurality of information signals in flexible multiplexing is performed. Generally, the invention thus also consists in a computer program product having a program code, stored on a machine-readable carrier, for performing the inventive method, when the computer program product runs on a computer and/or microcontroller. In other words, the invention may thus be realized as a computer program having a program code for performing the method, when the computer program runs on a computer and/or microcontroller.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for transmitting a plurality of information signals in accordance with cyclic time-division multiplexing, comprising:
    an estimator configured to estimate, for each of the information signals, a data rate with which the information signal is most likely to be encoded within a time slice which follows a current time slice;
    a processor programmed to determine, for each of the information signals and on the basis of the estimated data rate, a relative waiting time which indicates an estimated starting time of a subsequent time slice of the information signal, and to integrate each of the determined relative waiting times, unmodified, in the current time slice of an associated information signal to transmit the determined relative waiting times to a receiver; and
    a time-slice structurer configured to assign an actual starting time to each of the following time slices on the basis of an actual data rate for the information signal, such that the actual data rate can deviate from a data rate estimated by the estimator, wherein
    the time-slice structurer is configured to assign the actual starting times such that each of the actual starting times of the subsequent time slices is larger than or equal to the respectively estimated starting time;
    the apparatus is configured to transmit the plurality of information signals in accordance with cyclic time-division multiplexing according to a statistical multiplex, and the time-slice structurer is configured to assign, the actual starting times and the actual data rates in accordance with the statistical multiplex;
    the estimator is configured to perform the estimation of the data rate for each of the plurality of information signals such that each of the plurality of information signals is most likely to be encoded within the time slice which follows the current time slice, using the respective estimated data rate; and
    the processor is configured to directly translate, for each of the plurality of information signals, the estimated data rate into the estimated starting time such that, if the data of each of the plurality of information signals does not change by more than a predetermined amount, the estimated starting time coincides with the actual starting time for each of the plurality of information signals;
    wherein the estimator is configured to estimate a data rate of an information signal for the following time slice at least on the basis of preceding and current actual data rates of the information signal.

2. The apparatus as claimed in claim 1, wherein the processor is configured to determine the relative waiting time such that an estimated starting time and an actual starting time of the subsequent time slice perfectly coincide if the estimated data rate and the actual data rate of all of the information signals do not differ from each other.

3. The apparatus as claimed in claim 1, wherein the estimator is configured to estimate a data rate of an information signal for the following time slice on the basis of the estimated data rate, the actual data rate and a data rate of the information signal that is advantageous for the subsequent time slice.

4. The apparatus as claimed in claim 1, wherein the time-slice structurer is configured to assign to each of the current time slices an actual starting time and an actual data rate that may differ from a previously estimated data rate, and to change a duration of the current time slice by a differential time duration only when an estimated duration of the subsequent time slice is larger than the differential time duration.

5. The apparatus as claimed in claim 4, wherein the time-slice structurer is configured to determine the differential time duration as a function of a differential time duration resulting from an advantageous data rate for the current time slice, of a differential time duration resulting from a data rate that is advantageous for the preceding time slice, and of a delay of the actual starting time as compared to a starting time estimated in the preceding transmission cycle.

6. The apparatus as claimed in claim 1, wherein the time-slice structurer is configured to assign to each of the subsequent time slices a differential time duration in accordance with the actual data rate of the information signal so as to acquire the actual starting times in each case, the assigned differential time duration being dependent on an advantageous differential time duration of the subsequent time slice and of an advantageous differential time duration of the current time slice of the information signal.

7. The apparatus as claimed in claim 6, wherein the time-slice structurer is configured to select the differential time duration of a time slice of an information signal to be larger than a negative accumulated overall delay time of temporally preceding time slices of a transmission cycle.

8. The apparatus as claimed in claim 6, wherein the time-slice structurer is configured to select the differential time duration of a time slice of an information signal to be smaller than a maximally possible delay time of the time slice, the maximally possible delay time depending on a size of a jitter buffer associated with the information signal.

9. The apparatus as claimed in claim 1, wherein the time-slice structurer is configured to set each of the actual data rates in the subsequent transmission cycle as a function of the information signal to be transmitted in the subsequent transmission cycle and of data-rate cost, respectively.

10. The apparatus as claimed in claim 1, wherein the time-slice structurer is configured to credit each of the information signals with a value dependent on the data-rate cost when the time slice of the information signal is shortened, and to subtract a value dependent on the data-rate cost when the time slice of the information signal is extended.

11. The apparatus as claimed in claim 1, wherein the current and the subsequent transmission cycles comprising the current and the subsequent time slices are digital video broadcasting handheld (DVB-H) transmission cycles in each case.

12. A method for transmitting a plurality of information signals in accordance with cyclic time-division multiplexing, comprising:

estimating, for each of the information signals, a data rate with which the respective information signal is most likely to be encoded within a time slice which follows a current time slice;

determining, for each of the information signals and on the basis of the estimated data rate, a relative waiting time which indicates an estimated starting time of a subsequent time slice of the information signal;

integrating each of the determined relative waiting times, unmodified, in the current time slice of an associated information signal to transmit the determined relative waiting times to a receiver; and assigning an actual starting time and an actual data rate to each of the following time slices, such that the actual data rate can deviate from an estimated data rate, wherein in the step of assigning the actual starting times, each of the actual starting times of the subsequent time slices is larger than or equal to the respectively estimated starting time;

the plurality of information signals are transmitted in accordance with cyclic time-division multiplexing according to a statistical multiplex, and the actual starting times and the actual data rates are assigned in accordance with the statistical multiplex;

in the step of estimating, the data rate for each of the plurality of information signals is estimated such that each of the plurality of information signals is most likely to be encoded within the time slice which follows the current time slice, using the respective estimated data rate; and in the step of determining, the estimated data rate for each of the plurality of information signals is directly translated into the estimated starting time such that, if the data of each of the plurality of information signals does not change by more than a predetermined amount, the estimated starting time coincides with the actual starting time for each of the plurality of information signals; and estimating a data rate of an information signal for the following time slice at least on the basis of preceding and current actual data rates of the information signal.

13. A non-transitory computer readable medium including a computer program for performing, when the computer program runs on a computer and/or microcontroller, the method for transmitting a plurality of information signals in accordance with cyclic time-division multiplexing, said method comprising:

estimating, for each of the information signals, a data rate with which the respective information signal is most likely to be encoded within a time slice which follows a current time slice;

determining, for each of the information signals and on the basis of the estimated data rate, a relative waiting time which indicates an estimated starting time of a subsequent time slice of the information signal;

integrating each of the determined relative waiting times, unmodified, in the current time slice of an associated information signal to transmit the determined relative waiting times to a receiver; and assigning an actual starting time and an actual data rate to each of the following time slices, such that the actual data rate can deviate from an estimated data rate, wherein in the step of assigning the actual starting times, each of the actual starting times of the subsequent time slices is larger than or equal to the respectively estimated starting time;

the plurality of information signals are transmitted in accordance with cyclic time-division multiplexing according to a statistical multiplex, and the actual starting times and the actual data rates are assigned in accordance with the statistical multiplex;

in the step of estimating, the data rate for each of the plurality of information signals is estimated such that each of the plurality of information signals is most likely to be encoded within the time slice which follows the current time slice, using the respective estimated data rate; and in the step of determining, the estimated data rate for each of the plurality of information signals is directly translated into the estimated starting time such that, if the data of each of the plurality of information signals does not change by more than a predetermined amount, the estimated starting time coincides with the actual starting time for each of the plurality of information signals; and estimating a data rate of an information signal for the following time slice at least on the basis of preceding and current actual data rates of the information signal.

\* \* \* \* \*

UNITED STATES PATENT AND TRADEMARK OFFICE
CERTIFICATE OF CORRECTION

PATENT NO.       : 8,804,768 B2                                   Page 1 of 1
APPLICATION NO.  : 13/233188
DATED            : August 12, 2014
INVENTOR(S)      : Christian Forster et al.

It is certified that error appears in the above-identified patent and that said Letters Patent is hereby corrected as shown below:

On the Title page first inventor item (75) should read -- "Christian Forster, Nuernberg (DE)".

The second inventor item (75) should read -- "Andreas Mull, Nuernburg (DE)".

Signed and Sealed this
Twenty-fourth Day of February, 2015

Michelle K. Lee
*Deputy Director of the United States Patent and Trademark Office*